(12) United States Patent
Uno et al.

(10) Patent No.: US 7,719,734 B2
(45) Date of Patent: May 18, 2010

(54) HOLOGRAM RECORDING DEVICE

(75) Inventors: Kazushi Uno, Kawasaki (JP); Koichi Tezuka, Kawasaki (JP); Hiroyasu Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/356,992

(22) Filed: Jan. 21, 2009

(65) Prior Publication Data
US 2009/0128876 A1 May 21, 2009

Related U.S. Application Data

(63) Continuation of application No. PCT/JP2006/315717, filed on Aug. 9, 2006.

(51) Int. Cl.
*G03H 1/00* (2006.01)
(52) U.S. Cl. .............................. 359/30; 359/21; 359/35
(58) Field of Classification Search ........................ None
See application file for complete search history.

(56) References Cited

U.S. PATENT DOCUMENTS

| 5,157,555 | A | * | 10/1992 | Reno ........................... 359/823 |
| 6,108,110 | A | * | 8/2000 | Orlov et al. .................... 359/22 |
| 6,115,192 | A | * | 9/2000 | McDonald ................... 359/708 |
| 7,307,768 | B2 | | 12/2007 | Kawano et al. |
| 7,333,252 | B2 | | 2/2008 | Brotherton-Ratcliffe et al. |

| 2003/0112527 | A1 | * | 6/2003 | Curtis et al. ................. 359/719 |

FOREIGN PATENT DOCUMENTS

| JP | A 64-27043 | 1/1989 |
| JP | A 7-319372 | 12/1995 |
| JP | A 2005-37453 | 2/2005 |
| JP | A 2005-516258 | 6/2005 |

* cited by examiner

*Primary Examiner*—Arnel C Lavarias
(74) *Attorney, Agent, or Firm*—Greer, Burns & Crain, Ltd.

(57) ABSTRACT

A hologram recording device records holograms by interference between an recording beam and a reference beam. The device includes an objective lens exhibiting a predetermined aberration. It is supposed that the laser beam applied to the beam splitter has an light intensity of 1, the recording beam and the reference beam emitted from the beam splitter have light intensities of P and 1−P, respectively, the optical magnification for the recording beam traveling from the beam splitter to the objective lens is a, and N pixels are used for modulation of the recording beam in the spatial light modulator. When the recording beam at the predetermined region has an amplitude 1/k times the amplitude of the reference beam, and the amplitude of the recording beam is X times as great as when there is no aberration, the predetermined aberration of the objective lens is determined to satisfy the formula:

$$0 < X < \sqrt{\frac{a(1-P)}{0.6P}} \times \frac{1}{kN}.$$

3 Claims, 6 Drawing Sheets

FIG.6
PRIOR ART

HOLOGRAM RECORDING DEVICE

This application is a Continuation of International Application No. PCT/JP2006/315717, filed Aug. 9, 2006.

TECHNICAL FIELD

The present invention relates to a hologram recording device that records a hologram by interference between a recording beam and a reference beam.

BACKGROUND ART

Patent Document 1 discloses a conventional hologram recording device. The hologram recording device disclosed in this document is configured to apply a recording beam modulated by a spatial light modulation element vertically to a hologram recording medium, and obliquely apply a reference beam so as to superpose the reference beam on the recording beam, to thereby record a hologram by interference between the recording beam and the reference beam. The recording beam and the reference beam are generated by a beam splitter that splits a laser beam emitted by a light source. Between the spatial light modulation element and the hologram recording medium, a telecentric type objective lens is disposed. The telecentric type objective lenses are generally designed to have a low aberration as possible, and the wavefront aberration on a best image plane does not exceed 0.5 λrms, for example.

Patent Document 1: JP-A-07-319372

Such conventional hologram recording device has, however, the following drawback originating from the extremely small aberration of the objective lens.

Figure 5:
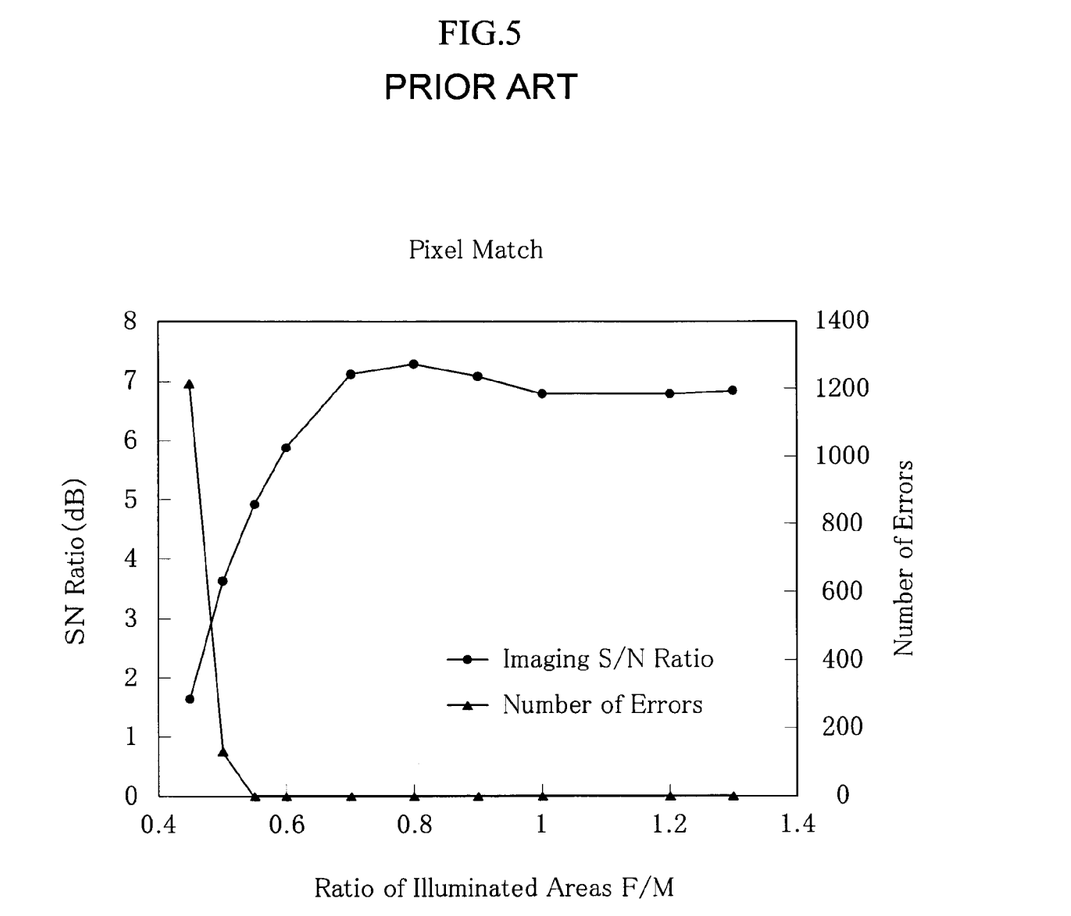
FIG. 5 is a graph for explaining the reproduction characteristic of a conventional hologram recording device.
Figure 6:
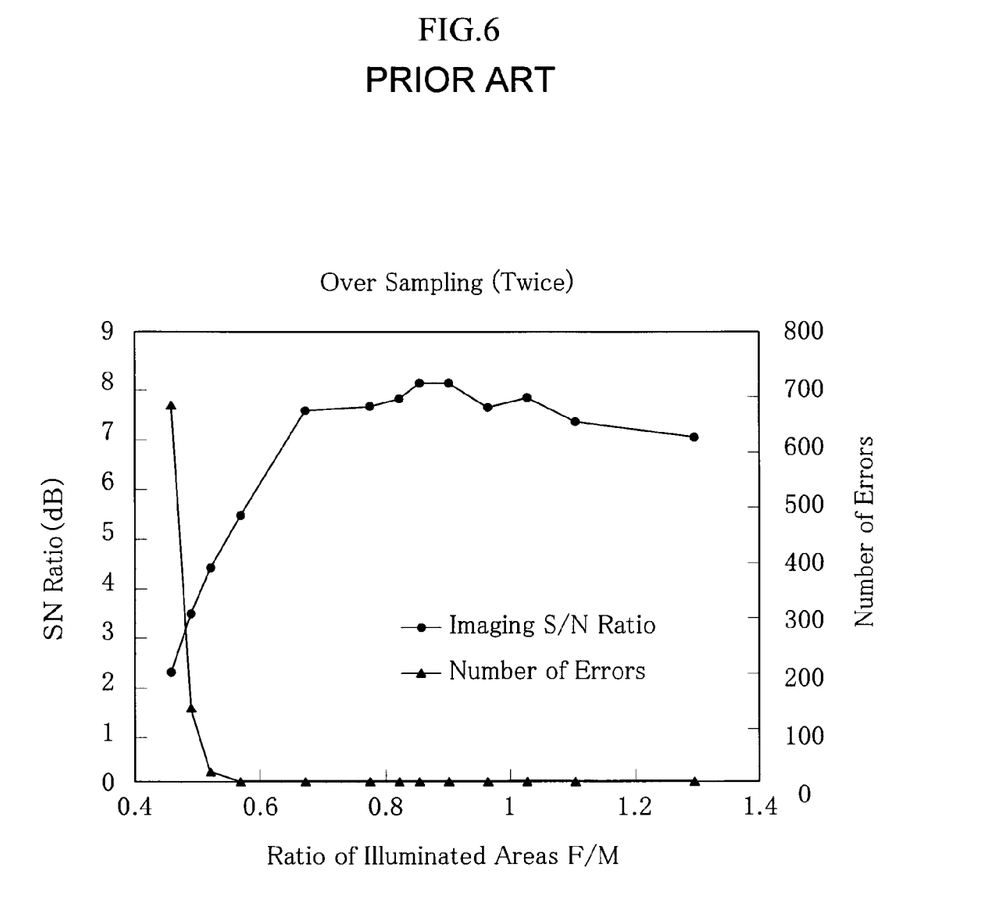

On the assumption that the best image plane of the recording beam is formed inside the hologram recording medium, and when the illumination area of the recording beam on the best image plane is designated by M and the illumination area of the reference beam on the best image plane by F, in the case where an illumination area ratio defined as F/M becomes smaller than 0.6 or so as shown in FIGS. 5 and 6, errors are frequently incurred at reproduction of the hologram. This can also be clearly understood in view of the S/N ratio tendency obtained through imaging signals.

Such reproduction error is considered to be associated with the image-forming performance of the objective lens. For example, under a condition where the aberration of the objective lens is as close as possible to 0, optically adjusting the amplitude and the light intensity of the recording beam and the reference beam, so as to emphasize the interference fringe of the 0-order image on the best image plane of the recording beam, leads to failure in clearly forming the interference fringe of other images such as a first order or second order image, resulting in failure in forming the overall hologram image in desirable contrast. Naturally, the hologram is not recorded in desirable contrast in regions other than the best image plane. At reproduction of the hologram, the reference beam is also applied to the regions other than the best image plane so as to generate the reproduction beam, and the reproduced image of the hologram is obtained through receiving the reproduction beam with an imaging device. Accordingly, the reproduced image is unclear as a whole since the recorded hologram includes a portion with good contrast and a portion with poor contrast. Thus, excessively reducing the aberration of the objective lens leads to the disadvantage that the reproduction error is increased.

DISCLOSURE OF THE INVENTION

The present invention has been proposed under the foregoing situation. An object of the present invention is to provide a hologram recording device capable of recording a hologram in a manner such that a reproduction error does not occur.

To achieve the foregoing object, the present invention takes the following technical measures.

The present invention provides a hologram recording device comprising: a beam splitter for splitting a laser beam from a light source into a recording beam and a reference beam; a spatial light modulator for modulating the recording beam according to information to be recorded; an objective lens for condensing the modulated recording beam into a predetermined region in a hologram recording medium; and a reference beam optical system for applying a reference beam to the predetermined region so as to superpose the reference beam on the recording beam. The recording device is configured to record a hologram at the predetermined region by interference between the recording beam and the reference beam. The objective lens is configured to have the aberration that has been determined in the following manner. Specifically, it is supposed that the laser beam applied to the beam splitter has an light intensity of 1, that the recording beam and the reference beam emitted from the beam splitter have light intensities of P and 1−P, respectively, that an optical magnification for the recording beam traveling from the beam splitter to the objective lens is a, and that use is made of N pixels for modulation of the recording beam in the spatial light modulator. Then, if the recording beam at the predetermined region has an amplitude 1/k times an amplitude of the reference beam, and the amplitude of the recording beam is X times as great as when there is no aberration, the predetermined aberration of the objective lens is determined to satisfy Formula 1 below:

$$0 < X < \sqrt{\frac{a(1-P)}{0.6P}} \times \frac{1}{kN}.$$

Preferably, k may be determined to satisfy 0.25<k<4, and the predetermined aberration of the objective lens may be determined so as to satisfy Formula 2 below:

$$0 < X < \sqrt{\frac{a(1-P)}{0.6P}} \times \frac{1}{0.25N}.$$

Preferably, the objective lens may be a compound lens of a spherical lens and an aspherical lens.

BRIEF DESCRIPTION OF THE DRAWINGS

FIG. 6 is another graph for explaining the reproduction

BEST MODE FOR CARRYING OUT THE INVENTION

A preferred embodiment of the present invention will be described below in details referring to the drawings. FIGS. 1 to 4 depict the embodiment of a hologram recording device according to the present invention.

Figure 1:
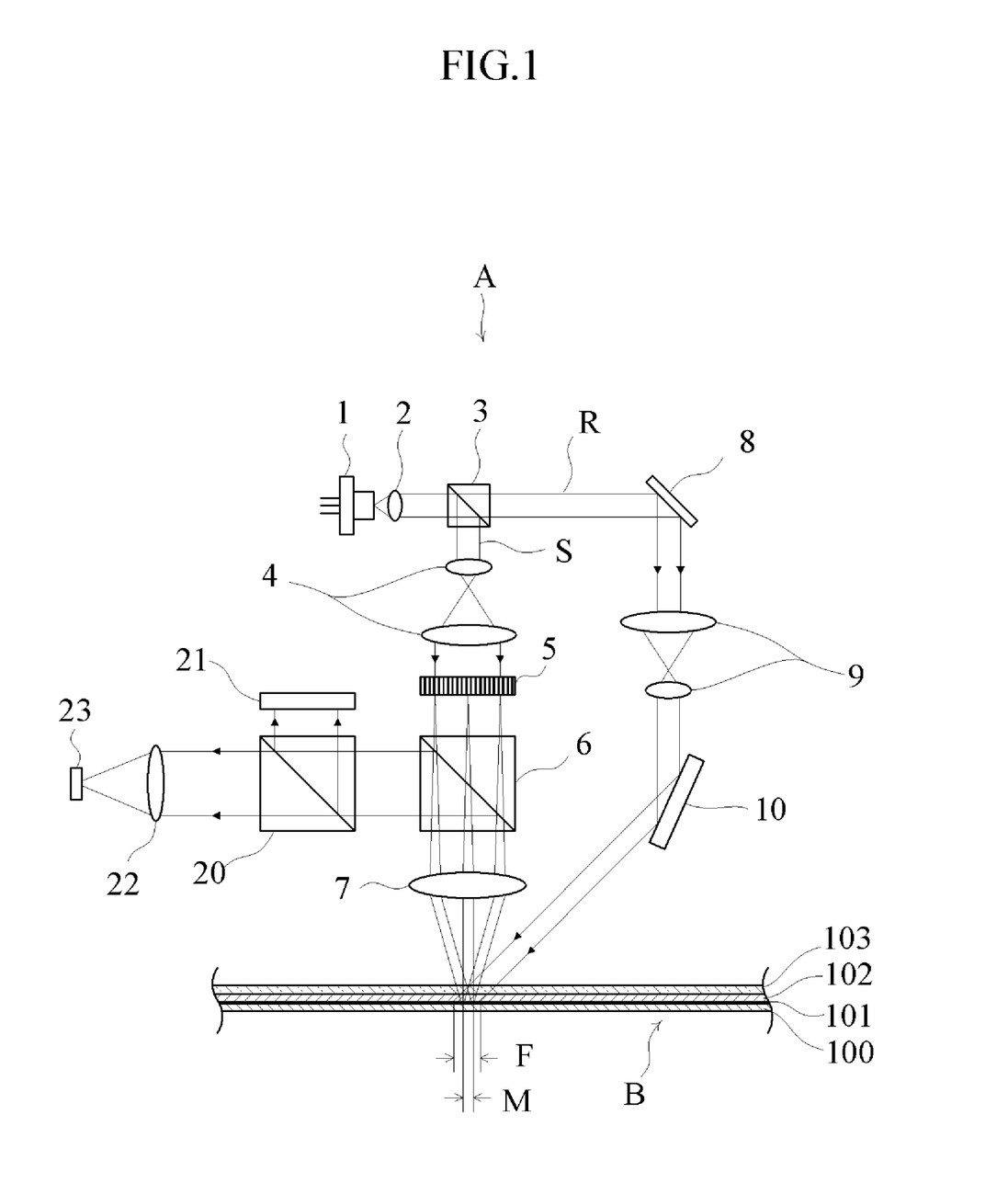
FIG. 1 is a schematic diagram showing an overall configuration of an embodiment of a hologram recording device to which the present invention is applied.

Referring to FIG. 1, the hologram recording device A is designed to record a hologram on a hologram recording medium B by an angle-multiplex recording process, and also to reproduce the recorded hologram. The hologram recording device A includes a light source 1, a collimator lens 2, a beam splitter 3, a zoom lens 4 for recording beam, a spatial light modulator 5, a first half mirror 6, an objective lens 7, a first reflector 8, a zoom lens 9 for reference beam, a second reflector 10, a second half mirror 20, an imaging device 21 for reproduction, a servo condenser lens 22, and a servo photosensor 23.

The hologram recording medium B includes a supporting substrate layer 100, a reflection layer 101, a recording layer 102, and a transparent substrate layer 103 stacked in this order, and is formed in a disk shape. To the recording layer 102, a recording beam and a reference beam are superposedly applied, and a hologram composed of an interference fringe is recorded therein. On the reflection layer 101, emboss pits are provided (not shown), so that the servo photosensor 23 detects fluctuation of light reflected by the emboss pits to thereby perform a servo control such as track control, focus control, or tilt control.

The light source 1 is constituted of a semiconductor laser for example, and emits a laser beam of a relatively narrow bandwidth which exhibits high coherency. The collimator lens 2 converts the laser beam emitted by the light source 1 into parallel light. The parallel light emitted from the collimator lens 2 is split into the recording beam S and the reference beam R by the beam splitter 3. After the diameter of the recording beam S is enlarged by the zoom lens 4, the recording beam impinges on the spatial light modulator 5. The reference beam R is applied to the hologram recording medium B via the first reflector 8, the zoom lens for reference beam 9, and the second reflector 10, sequentially. The second reflector 10 is constituted, for example, of a galvano mirror. With such structure, the reference beam R is applied to the hologram recording medium B at different incident angles.

Figure 2:
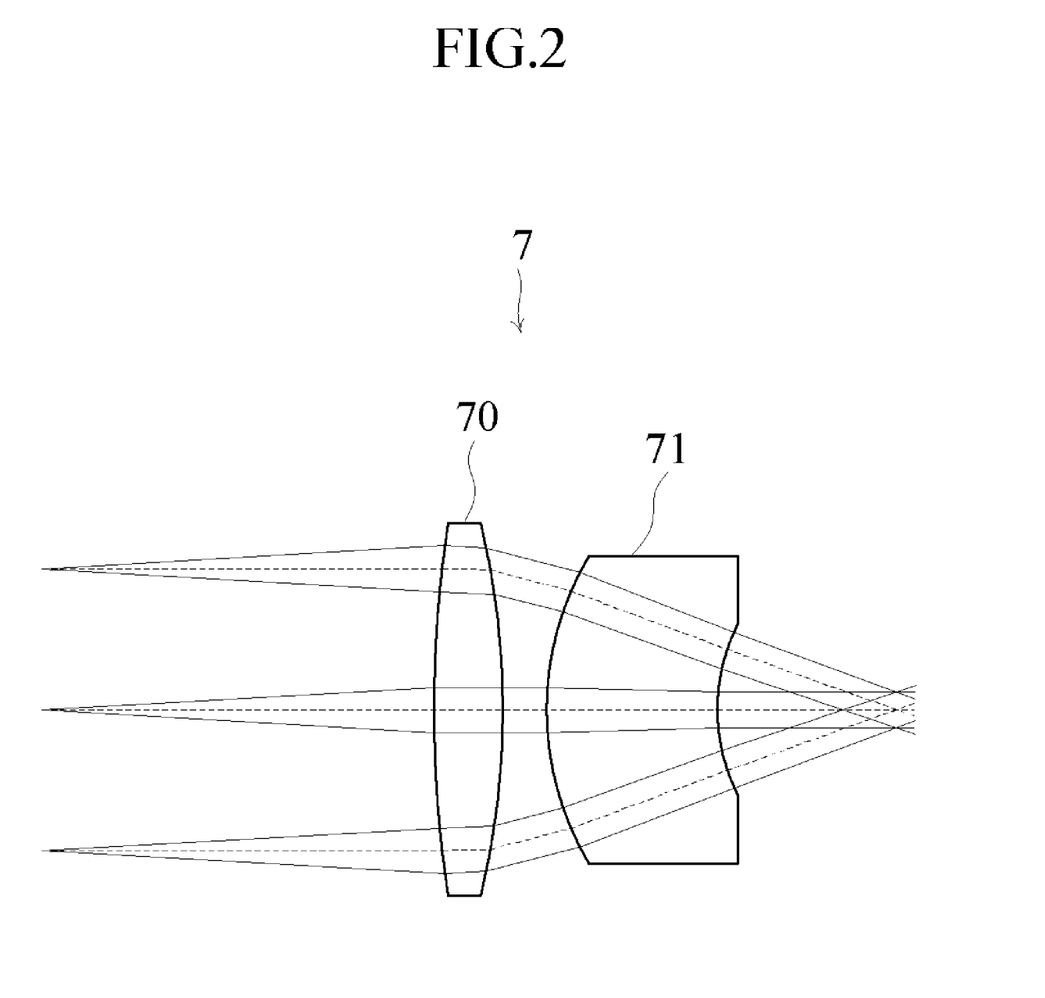
FIG. 2 is a fragmentary cross-sectional view of the hologram recording device shown in FIG. 1.

The spatial light modulator 5 is constituted, for example, of a transmissive liquid crystal device. The spatial light modulator 5 modulates the incoming recording beam into light including a pixel pattern according to information to be recorded. The recording beam emitted from the spatial light modulator 5 is transmitted through the first half mirror 6, and then applied to a predetermined region of the hologram recording medium B via the objective lens 7. In a reproduction process, the reference beam interferes with the hologram on a target region in the hologram recording layer 102 thereby generating a reproduction beam, which reaches the objective lens 7, the first half mirror 6, and then the second half mirror 20 to be received by the imaging device 21 for reproduction. The objective lens 7 is, as shown in FIG. 2, a compound lens composed of a convex lens 70 having both sides each provided with an aspherical surface and a concave lens 71 having both sides each provided with a spherical surface. The convex lens 70 is located on the side which the recording beam S enters, while the concave lens 71 is located on the side which the recording beam S leaves from. Such objective lens 7 is given a predetermined wavefront aberration, so that the recording beam remains telecentric only on the side of the spatial light modulator 5 (i.e. the side which the beam enters).

An optical effect of the hologram recording device A will now be described below.

The best image plane of the recording beam S is formed on the recording layer 102 of the hologram recording medium B. When the illumination area of the recording beam S on the best image plane is designated by M and the illumination area of the reference beam on the best image plane by F, the illumination area M and F are in the following relationship, for the reason described in the chapter of the BACKGROUND ART.

$$0.6M < F \qquad \text{Formula 3}$$

On the assumption that the light intensity of the laser beam impinging on the beam splitter 3 is 1, the incident area of the laser beam impinging on the beam splitter 3 is 1, the light intensities of the recording beam S and the reference beam R split by the beam splitter 3 are P and 1−P, respectively, the optical magnification of the recording beam S attained upon reaching the objective lens 7 from the beam splitter 3 (i.e. optical magnification by the zoom lens 4) is a, and the number of pixels used for modulating the recording beam S with the spatial light modulator 5 is N, the amplitude fs of the recording beam S on the best image plane is obtained as below on the assumption that the wavefront aberration of the objective lens 7 is 0, since the light intensity is inversely proportional to the illumination area, and the light intensity corresponds to the square of the amplitude of the beam.

$$fs = N\sqrt{\frac{P}{aM}} \qquad \text{Formula 4}$$

In this embodiment, since the objective lens 7 is given the predetermined wavefront aberration, the amplitude fs of the recording beam S becomes X times as large with respect to the case where the wavefront aberration is 0, as the following formula.

$$fs = XN\sqrt{\frac{P}{aM}} \qquad \text{Formula 5}$$

Meanwhile, the amplitude fr of the reference beam R is defined as follows, when the optical magnification of the reference beam during the travel up to the hologram recording medium B (optical magnification by the zoom lens 9) is designated by b.

$$fr = \sqrt{\frac{1-P}{b}} \qquad \text{Formula 6}$$

Referring to the recording beam S, the following formulae are given on the assumption that the amplitude fs on the best image plane is 1/k times as large as the amplitude fr of the reference beam R.

$$k \times fs = fr \qquad \text{Formula 7}$$

$$kXN\sqrt{\frac{P}{aM}} = \sqrt{\frac{1-P}{b}}$$

Here, when the reference beam R reaches the hologram recording medium B without having its luminous flux narrowed, since the illumination area F of the reference beam R is "b" times as large as that in the case where the incidence area of the laser beam on the beam splitter 3 is 1, F=b is established. Since the illumination area F (=b) is larger than 0.6M according to the formula 3, the following formula is established.

$$kXN\sqrt{\frac{P}{aM}} < \sqrt{\frac{1-P}{0.6M}} \qquad \text{Formula 8}$$

The formula 8 can be rewritten as follows with respect to X.

$$0 < X < \sqrt{\frac{a(1-P)}{0.6P}} \times \frac{1}{kN} \qquad \text{Formula 9}$$

Thus, the wavefront aberration of the objective lens 7 is designed such that the amplitude fs of the recording beam S becomes X times as large with respect to the case where the wavefront aberration is 0, and that X satisfies the formula 9. In this embodiment, the aberration of the spatial light modulator 5 is approximately 280 mλrms for example, and the wavefront aberration of the objective lens 7 is set at approximately 1.9 λrms. In the case where the optical axis of the objective lens 7 is inclined by 28 degrees or so with respect to the hologram recording medium B, the wavefront aberration of the objective lens 7 becomes approximately 2.5 λrms.

Figure 3:
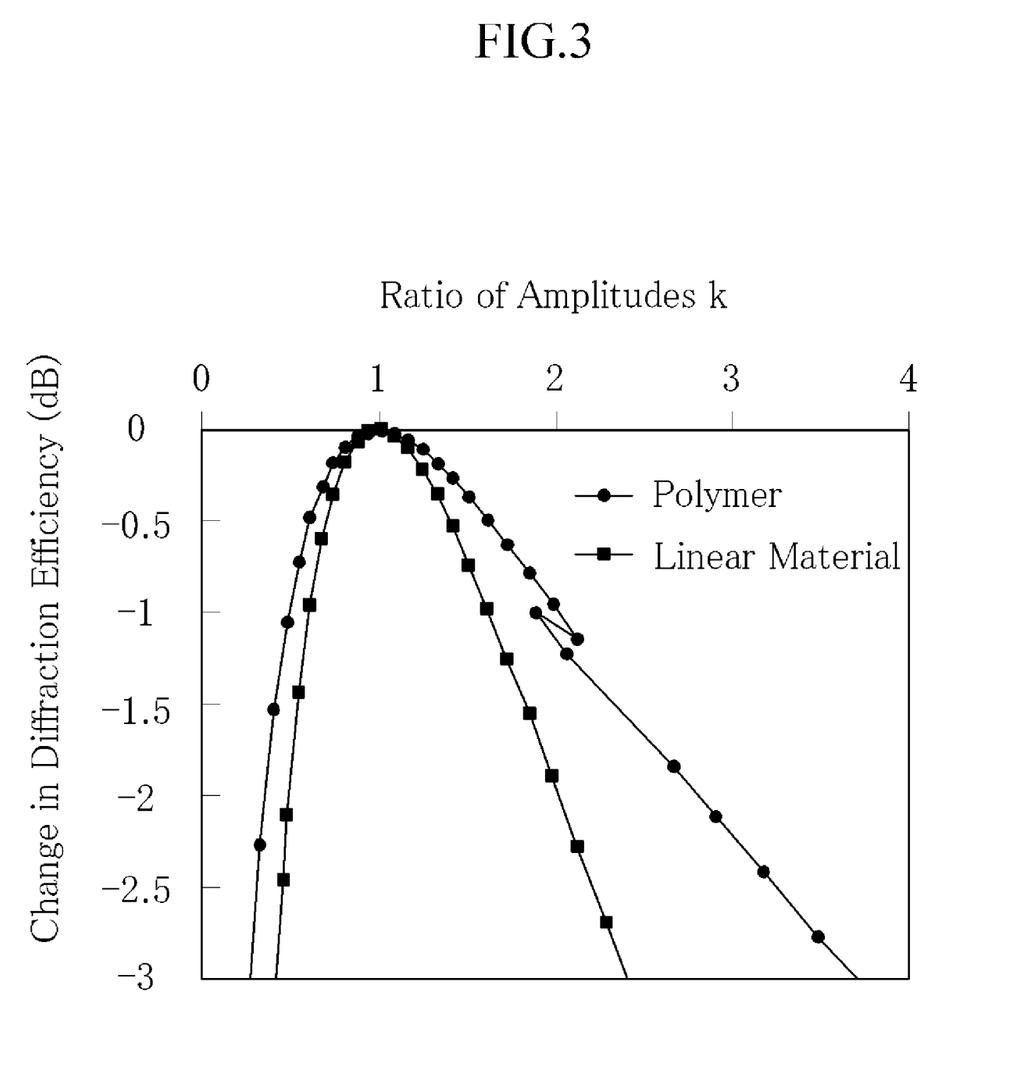
FIG. 3 is a graph for explaining the optical characteristic of a hologram recording medium.

Also, the relationship between k, which is the amplitude ratio between the amplitude fs of the recording beam S and the amplitude fr of the reference beam R, and the fluctuation of diffraction efficiency η exhibits a tendency as shown in FIG. 3. A changed portion of the diffraction efficiency η indicated by the vertical axis of FIG. 3 corresponds to a decrease in imaging signal in the S/N ratio. A light intensity I required for diffraction of the recording beam S and the reference beam R can be expressed as follows utilizing the amplitudes fs, fr.

$$I=2fs \cdot fr \qquad \text{Formula 10}$$

Since the light intensity per unit time of the laser beam emitted by the light source 1 is constant, the following formula can be established regarding the light intensity of the recording beam S and the reference beam R.

$$fs^2+fr^2=1 \qquad \text{Formula 11}$$

The formula of the light intensity I required for diffraction of the recording beam S and the reference beam R can be modified as follows based on the formulae 10, 11.

$$I=2fs\sqrt{1-fs^2} \qquad \text{Formula 12}$$

Referring to the optical characteristic of the hologram recording medium B, ideally the following relationship is present between the given light intensity I and the diffraction efficiency η.

$$\eta \propto I^2 \qquad \text{Formula 13}$$

In the case of employing, for example, a photopolymer as the material for the hologram recording medium B, actually the following formula is established.

$$\eta \propto 2fs\sqrt{1-fs^2} \qquad \text{Formula 14}$$

As shown in FIG. 3, the diffraction efficiency η is decreased to a half or lower, when the amplitude ratio k is increased to approximately 4 times.

Figure 4:
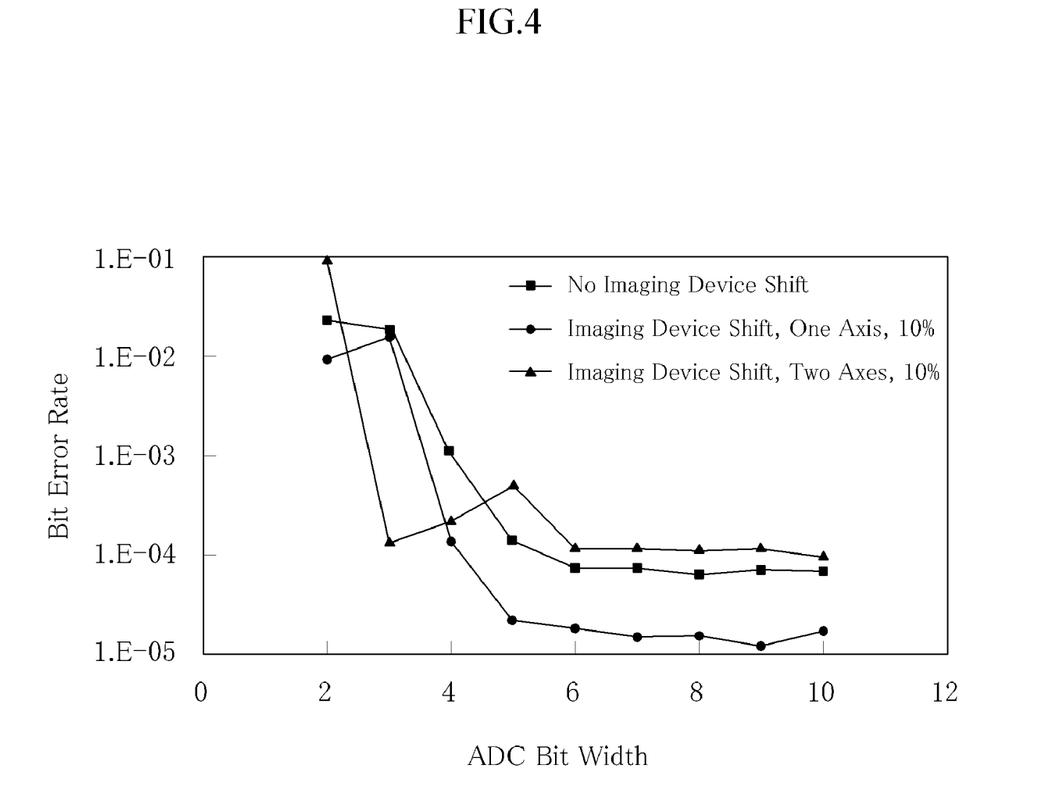
FIG. 4 is a graph for explaining the reproduction characteristic of the hologram recording device shown in FIG. 1.

The performance of the imaging device 21 for reproduction will now be focused on. As shown in FIG. 4, the bit width of the A/D converter of the imaging device 21 is required to be 7 bits or more, based on the relationship with the error rate. Assuming that the detection error is 1 bit or less, the substantial bit width of the A/D converter is bits or more. This means that an error corresponding to only two gradations against 128 gradations is permissible, and hence the S/N ratio has to be 36 dB or greater.

For example, upon setting the data transfer rate at 500 Mbps, the effective pixel count by oversampling of twice at 25%, the gross pixel count as 2048×2048, the effective transfer rate by application of what is known as 2/4 coding at 50%, time required for mechanical drive and exposure time required for imaging as 50% each, and the exposure cycle at 2000/sec, the exposure time T becomes approximately 0.5 msec, according to the following formula.

$$2048 \cdot 2048 \cdot 0.25 \cdot 0.5 \cdot 2000 \cdot T = 1024 \cdot 1024 \cdot 500 \qquad \text{Formula 15}$$

The laser output power of the light source 1 is 100 mW at maximum in the wavelength region of 405 nm, and is decreased to 40% or less at the best because of optical loss suffered through the travel of the recording beam S up to the hologram recording medium B, and 50% or less in the case where the reproduction beam from the hologram recording medium B advances to the imaging device 21. Also, in the case of employing a photopolymer as the material for the hologram recording medium B, the diffraction efficiency η becomes 1E−3 or lower, and the fill factor becomes 0.5 or less. Based on those conditions, the light intensity Ip allocated to each pixel can be expressed as follows.

$$IP = \frac{100 \cdot 0.4 \cdot 0.5 \cdot 0.001 \cdot 4 \cdot 0.5}{1024 \cdot 1024 \cdot 4} \qquad \text{Formula 16}$$

$$= 0.95E - 11 (W/\text{pixel})$$

On the assumption that 1 sec is taken as reference and the photoelectric conversion efficiency is 42%, photon density P can be expressed as follows, based on the photon energy 5E−19J at the wavelength region of 405 nm.

$$P = \frac{0.95 \times 10^{-11} \cdot 0.42}{5 \times 10^{-19}} \qquad \text{Formula 17}$$

$$= 0.8E + 7 (\text{photons/pixel/sec})$$

Since the exposure time is 0.5 msec in this case, the photon count becomes 4000 at maximum. Meanwhile, in the imaging device 21, the photon count at non-exposure period becomes 50 or more, and the maximum S/N ratio becomes approximately 38 dB. Accordingly, if the photon count input to the imaging device 21 is decreased to half, the S/N ratio becomes 32 dB, which is below 36 dB, and therefore the amplitude ratio k is set as follows, to obtain the reproduction beam having sufficient light intensity at the imaging device 21.

$$0.25 < k < 4 \qquad \text{Formula 18}$$

According to the formula 18, the formula 9 can actually be modified as follows.

$$0 < X < \sqrt{\frac{a(1-P)}{0.6P}} \times \frac{1}{0.25N} \qquad \text{Formula 19}$$

In this embodiment, based on the foregoing optical conditions, the pixel count of the spatial light modulator 5 is set at 1024×768; the 2/4 coding is adopted to utilize 25% of the total pixel count to transmit the beam; the laser beam is split by the beam splitter 3 such that 50% of the light intensity is allocated to the recording beam S and the reference beam R, respectively; and the optical magnification "a" of the zoom lens 4 is set at 6 times. Based on such conditions, the objective lens 7 is designed to have the wavefront aberration of 0<X<4.02E-6.

The hologram recording device A according to this embodiment enables, therefore, minimizing reproduction errors at recording a hologram, since the objective lens 7 is given an appropriately determined wavefront aberration. Also, the hologram recording device A can be easily obtained simply by giving the appropriate aberration to the objective lens 7, without the need to provide a complicated mechanism to prevent the reproduction error, thereby minimizing fluctuation in performance level among the devices and thus upgrading the reliability thereof.

The present invention is not limited to the foregoing embodiment. The numerical values for the foregoing embodiments are merely exemplary, and may be modified for the desired configurations.

The invention claimed is:

1. A hologram recording device comprising: a beam splitter for splitting a laser beam from a light source into a recording beam and a reference beam; a spatial light modulator for modulating the recording beam according to information to be recorded; an objective lens for condensing the modulated recording beam into a predetermined region in a hologram recording medium; and a reference beam optical system for applying a reference beam to the predetermined region so as to superpose the reference beam on the recording beam; the device being configured to record a hologram at the predetermined region by interference between the recording beam and the reference beam, wherein the objective lens has a predetermined aberration, wherein when it is supposed that the laser beam applied to the beam splitter has an light intensity of 1, that the recording beam and the reference beam emitted from the beam splitter have light intensities of P and 1−P, respectively, that an optical magnification for the recording beam traveling from the beam splitter to the objective lens is a, and that use is made of N pixels for modulation of the recording beam in the spatial light modulator, if the recording beam at the predetermined region has an amplitude 1/k times an amplitude of the reference beam, and the amplitude of the recording beam is X times as great as when there is no aberration, the predetermined aberration of the objective lens is determined to satisfy a formula:

$$0 < X < \sqrt{\frac{a(1-P)}{0.6P}} \times \frac{1}{kN}.$$

2. The hologram recording device according to claim 1, wherein k is determined to satisfy 0.25<k<4.

3. The hologram recording device according to claim 1, wherein the objective lens is a compound lens of a spherical lens and an aspherical lens.

* * * * *